(12) United States Patent  (10) Patent No.: US 6,675,917 B2
Kleine et al.                (45) Date of Patent:   Jan. 13, 2004

(54) TWIST DRILL BIT FOR ROCK DRILLING

(75) Inventors: Werner Kleine, Achim (DE);
Hans-Werner Bongers-Ambrosius, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/972,285

(22) Filed: Oct. 5, 2001

(65) Prior Publication Data

US 2002/0040813 A1 Apr. 11, 2002

(51) Int. Cl.⁷ ............................................... E21B 10/44
(52) U.S. Cl. ................. 175/323; 175/394; 408/226; 408/230
(58) Field of Search .............................. 76/108.2, 108.6; 175/323, 385, 386, 394; 408/226, 227, 230

(56) References Cited

U.S. PATENT DOCUMENTS 4,549,616 A * 10/1985 Rumpp et al. ............... 175/394
4,579,180 A * 4/1986 Peetz et al. .................. 175/394
4,932,815 A * 6/1990 Krauss ......................... 408/230
6,427,789 B1 * 8/2002 Fuss et al. .................... 175/323

FOREIGN PATENT DOCUMENTS

DE  2358447   3/1975
EP  0790092   8/1997

OTHER PUBLICATIONS

Abstract retrieved from Derwent Information Ltd.*

* cited by examiner

*Primary Examiner*—David Bagnell
*Assistant Examiner*—Brian Halford
(74) *Attorney, Agent, or Firm*—Sidley Austin Brown & Wood, LLP

(57) ABSTRACT

A twist drill bit (1) for use in rock has a helical land (7) arranged between a chuck insert end (2) and a tool head (3), and extends helically around a rotational axis (A) extending along a shaft (5). The radially outer surface (8) of the land (7) has its width (x) increasing as it approaches the tool head (3).

4 Claims, 1 Drawing Sheet

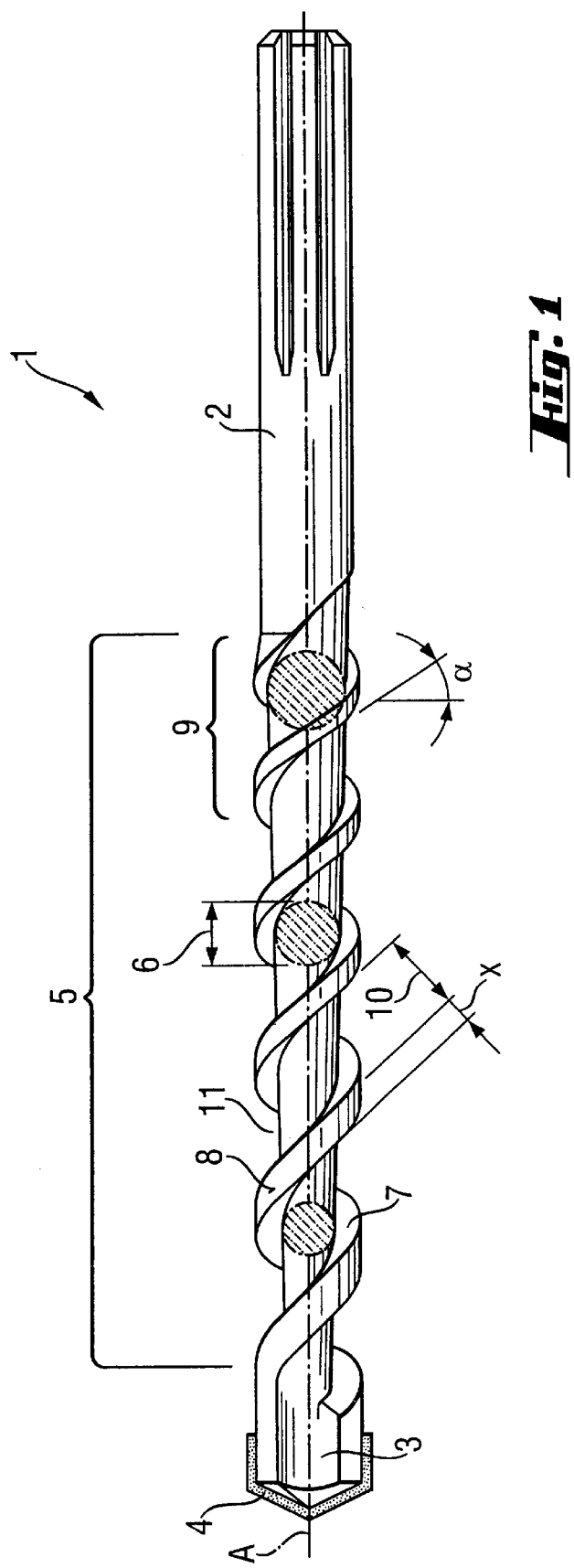

TWIST DRILL BIT FOR ROCK DRILLING

BACKGROUND OF THE INVENTION

The invention is directed to a twist drill bit that is rotated by a hand-held tool device, the drill bit is designed principally for abrasive cutting or chipping of rock and other rock-like materials, such as concrete and masonry.

Rock drills of this type are characterized by a tool shaft rotatable about an axis and having a shaft core, extending between a tool head that is generally comprised of cutting edges fabricated of hard-metal and a chuck insert end and designed for insertion into the chuck of a hand-held drilling tool, around which several helical discharge grooves are formed. With the rotation of the twist drill around its rotational axis, the outer surface of the shaft, formed by the radial outer surface of the helical lands, describes an essentially cylindrical envelope having the diameter of the bore hole. The helical grooves formed on the drill bit shaft, and the envelope surface of the bore hole, serve to remove the abrasively excavated material.

The area of the shaft situated immediately behind the tool head is subjected to a high rate of wear as a result of the extended period of contact with the rigid walls of the bore hole, whereby the diameter of the envelope surface in such region is reduced and consequently assumes a conical shape. In conjunction with the radial wear on the cutting surfaces on the tool head, and in the case of worn twist drill bits, this results in a seizing of the conical shank at the conical sides of the bore hole when carrying out deeper drilling operations. Furthermore, twist drills having a cross-section of less than 15 mm are prone to blockage as a consequence of the concentration of the cut material in the helical discharge grooves.

DE 19707608A1 discloses a twist drill bit for producing conical holes in non-metallic material, the drill bit being particularly suited for screw connections. To this end the twist drill bit is characterized by a shank tapering conically to a point having spiral-shaped discharge grooves. Twist drills of this type are not suitable for drilling hard material such as rock.

U.S. Pat. No. 5,482,124 discloses a rock drill that is characterized by various increments of the discharge helical grooves along its axis of rotation, whereby the grooves increase in size in the direction of the tool head.

According to CH476559, a rock drill is characterized as having a variable drill shaft diameter along the axis of rotation. In order to achieve a lighter weight and the enhanced drill performance associated therewith, the drill shaft is tapered in the axial mid-section of the shaft, whereas it is reinforced at the transition to the chuck insert end and at the tool head, so that vibration node points that lead to material fatigue can be shifted or better absorbed without damage.

SUMMARY OF THE INVENTION

A primary object of the invention is that of reducing the twisting wear in the case of worn twist drill bits. A further aspect is based on the reduction of blockage in the helical discharge grooves.

Generally, in a rock drill bit the width of the outer surface of the helical section expands along the axis of rotation in the direction of the tool head.

Due to the expanded outer surface of the helical section, radial wear is counteracted in the region adjacent to the tool head, whereby an extended life of the twist drill results relative to a certain permissible reduction of the hollow spatial area of the drill bit.

In order to avoid prolonged alternating stress fractures at the vibration nodes, the drill shaft is designed to be advantageously reinforced at the chuck insert end. Of further advantage is the fact that the drill shaft varies along the axis of rotation, whereby it is designed thicker in the regions of the vibrational nodes and, consequently, relative to a certain permissible prolonged alternating stress averaged over its length, is designed more elongated and thus lighter.

Also advantageous is the fact that the reduced cross-section area of the discharging helical grooves achieved by the wider outer surface of the helical section is compensated by the tapering drill shaft diameter towards the tool head.

The cross-sectional area of the discharging helical grooves becomes advantageously larger in the direction of the chuck insert end by virtue of the narrower outer surface of the helical section, whereby the risk of blockage is counteracted. A further advantage is represented by the fact that the pitch of the helical lands along the shaft varies and it decreases particularly towards the chuck insert end, whereby in the case of vertical boring downwardly adequate conveyance of the cut and/or chipped material is achieved, while at the same time it loses kinetic energy along the shaft.

BRIEF DESCRIPTION OF THE DRAWING

The invention is explained more fully in reference to an exemplary embodiment and in view of the drawing in which:

FIG. 1 is an axially extending side view, partly in section, of a twist drill bit embodying the invention.

DETAILED DESCRIPTION OF THE INVENTION

In FIG. 1 a twist drill 1 for rock is shown along its axis of rotation A with two helical discharge lands 7 extending between a chuck insert end 2 and a tool head end 3 having cutting edges 4 comprised of hard-metal. The lands extend helically around a shaft 5 having a core, with the width x of the outer surface 8 of the lands 7 increasing towards the tool head 3. The drill core shaft diameter 6 varies along the axis of rotation A, and in the region of the vibrational node 9 in the longitudinal midpoint of the drill is designed thicker. While, by the reduction of the drill core diameter 6, the depth of the helical land 7 increases proportionally as its width 10 decreases, the cross-section of the helical grooves remains the same. The pitch a of the helical lands 7 decreases along the core 5 in the direction of the chuck insert end 2.

What is claimed is:

1. A twist drill bit for use in drilling rock and rock-like materials comprises an axially extending shaft (5) having a tool head (3) at a leading end and a chuck insert end (2) at a trailing end, at least one land (7) extending helically around said shaft from said tool head to said chuck insert end and forming a helical groove (11) between adjacent turns of said land, said land having a radially outer surface (8) increasing in axial width in the direction from said chuck insert end (2) to said tool head (3), a pitch (α) of said land (7) varies along the axial length of said shaft (5) and decreases in the direction from said tool head to said chuck insert end (2).

2. A twist drill bit, as set forth in claim 1, wherein said shaft has a diameter (6) increasing from said tool head to said chuck insert end.

3. A twist drill bit, as set forth in claim 2, wherein the cross-sectional area of said helical groove reduced by the wider axial dimension of said outer surface (8) is compensated by said shaft diameter tapering inwardly towards said tool head (3).

4. A twist drill bit, as set forth in claim 3, wherein the cross-sectional area of said helical groove (11) increases in the direction from said tool head (3) to said chuck insert end (2).

* * * * *